United States Patent [19]

Ozawa

[11] Patent Number: 5,721,987
[45] Date of Patent: Feb. 24, 1998

[54] METHOD OF CHECKING A BATTERY OF A CAMERA AND A DEVICE

[75] Inventor: Katsuji Ozawa, Omiya, Japan

[73] Assignee: Fuji Photo Optical Co., Ltd., Omiya, Japan

[21] Appl. No.: 683,545

[22] Filed: Jul. 15, 1996

[30] Foreign Application Priority Data

Jul. 18, 1995 [JP] Japan .................................. 7-181625

[51] Int. Cl.$^6$ ........................................... G03B 7/26
[52] U.S. Cl. ........................ 396/263; 396/277; 396/302
[58] Field of Search ............................. 396/277, 279, 396/301, 302, 303, 222, 263, 265, 264

[56] References Cited

U.S. PATENT DOCUMENTS

| | | |
|---|---|---|
| 4,350,418 | 9/1982 | Taguchi et al. ............................. 354/25 |
| 4,716,433 | 12/1987 | Alyfuku ...................................... 354/468 |
| 4,982,220 | 1/1991 | Akasaka ..................................... 354/468 |
| 5,070,357 | 12/1991 | Kazami et al. ............................. 354/468 |
| 5,162,839 | 11/1992 | Wakabayashi et al. ................... 354/484 |
| 5,164,761 | 11/1992 | Isono et al. ................................ 354/468 |
| 5,210,538 | 5/1993 | Miyake et al. ............................. 354/418 |

Primary Examiner—Safet Metjahic
Assistant Examiner—Christopher E. Mahoney
Attorney, Agent, or Firm—Sixbey, Friedman Leedom & Ferguson; David S. Safran

[57] ABSTRACT

This camera performs battery checking which corresponds to the respective photographing modes at the time of presetting the various photographing modes. This battery check calculates an added electrical quantity between an electrical quantity consumed for 5 minutes, during which an autopower off mechanism is operated in a state where a photographing mode is set and an electrical quantity required for the time from the start of the photographing under this photographing mode to completion of the photographing under this photographing mode in association with the selected photographing mode. Then, the added electrical quantity thus calculated is compared with a residue of the battery for a camera power source, and, only when the residue of the battery exceeds the added electrical quantity, presetting of the photographing mode is permitted. When presetting of the photographing mode is permitted with this arrangement, photographing can be carried out reliably until the execution of the photographing mode is completed.

6 Claims, 4 Drawing Sheets

METHOD OF CHECKING A BATTERY OF A CAMERA AND A DEVICE

BACKGROUND OF THE INVENTION

1. Field of the Invention

This invention relates to a method of checking a battery of a camera and a device, and more particularly to a method of checking a battery of a camera having an auto-power off mechanism, a self-timer photographing mechanism, an internal photographing mechanism or a continuous photographing mechanism, and a device.

2. Description of the Related Art

There has heretofore been a camera provided with a battery check mechanism. In the camera of this type, a residual electrical charge of a battery loaded in a camera is displayed on a liquid crystal plate and the like, or, when the residual electric charge of the battery is decreased to an electrical quantity insufficient for further photographing for example, an alarm lamp is flicking and so forth, so that a user can recognize the time for a battery change. By using of this type camera, such disadvantages can be avoided, as, for example, sudden previous discharged battery causing a photographic opportunity to be missed, when a reserve battery to be exchanged is not close at hand.

Furthermore, there has been a camera provided with such a self-timer photographing mechanism that a shutter release is performed in a predetermined period of time after a shutter button is pressed, and thereafter, a preset number of frames of a film are photographed at predetermined time intervals. For example, when three frames of the film for self-timer photographing are preset, for the first frame of the film the shutter release is performed 10 seconds after a shutter button is pressed, and the second frame and further frames of the film are photographed at intervals of 3 seconds, thus automatically performing the photographing of the three frames of the film.

Further, there has been a camera provided with such a continuous photographing mechanism that, when the shutter button is continuously pressed, the shutter releases are continuously performed at intervals of a predetermined time.

Furthermore, there has been a camera provided with such an interval photographing mechanism that photographing is automatically performed at intervals of the preset time. For example, when the interval photographing at intervals of 60 minutes is preset, the first frame of the film is taken as soon as the shutter button is pressed, and thereafter, the remaining frames of the film is automatically taken at the intervals of 60 minutes.

At present, the battery check mechanism provided on the conventional camera, the battery check does not consider the electric power required before the shutter button is pressed and the battery check is separate from the above-described photographing modes described above.

In the case where the battery check is performed during normal photographing and the display shows there is enough electrical quantity for photographing, but one of the above-described photographing modes is preset, it is possible there is not enough electrical quantity to enable photographing due to the electricity consumed during the time that is needed before the shutter release is made, or in the case when a plurality of frames of the film are automatically taken under the above-described photographing mode, then such a case may occur that the battery runs out during the execution of the photographing mode.

SUMMARY OF THE INVENTION

The present invention has been developed to eliminate the above-described disadvantages and has as its object the provision of a method of checking a battery in a camera provided with a photographing mechanism operable in a self-timer photographing mode, a photographing mechanism operable in a continuous photographing mode, a photographing mechanism operable in an interval photographing mode or the like, wherein, when presetting of these photographing modes is permitted, photographing can be reliably carried out until the execution of the photographing mode is completed, and a device for performing this method.

To achieve the above-described object, the present invention is characterized in that, in the camera provided with the photographing mechanism operable in the self-timer photographing mode, in which a plurality of preset frames of a film are photographed at intervals of a predetermined time and an auto-power off mechanism, in which, when the camera is maintained for more than a predetermined time in a state where a power source is on, the power supply from the battery for the camera power source is automatically stopped, in a case where the self-timer photographing mode is preset, a residual charge of the battery is detected, and, only when the residual charge exceeds the sum of an electrical quantity consumed during the predetermined time, during which the auto-power off mechanism is operated in a state where the self-timer photographing mode is preset and an electrical quantity required in a case where all of the plurality of preset frames of the film are photographed under the self-timer photographing mode after the self-timer photographing is started under the self-timer photographing mode, presetting of the self-timer photographing mode is permitted.

Furthermore, the present invention is characterized in that, in the camera provided with the photographing mechanism operable in the continuous photographing mode, in which, when the shutter button is continuously pressed, the shutter releases are continuously performed at the intervals of the predetermined time, and the auto-power off mechanism in which, when the camera is maintained for more than the predetermined time in the state where the camera power source is on, the power supply from the battery as the camera power supply is automatically stopped, in the case where the continuous photographing mode is preset, a residual charge of the battery is detected, and, only when the residual charge exceeds the sum of an electrical quantity consumed during the predetermined time, during which the auto-power off mechanism is operated in a state where the continuous photographing mode is preset and an electrical quantity required in a case where all of the plurality of preset frames of the film are continuously photographed after the continuous photographing is started under the continuous photographing mode, presetting of the continuous photographing mode is permitted.

Further, the present invention is characterized in that, in the camera provided with the interval photographing mechanism operable in the interval photographing mode, in which photographing is performed at the intervals of the preset time and the auto-power off mechanism, in which, when the camera is maintained for more than the predetermined time in the state where the camera power source is on, the power supply from the battery for the camera power source is automatically stopped, in a case where the continuous photographing mode is preset, a residual charge of the battery is detected, and, only when the residue exceeds an added electrical quantity between an electrical quantity consumed during the predetermined time, during which the auto-power off mechanism is operated in a state where the continuous photographing mode is preset and an electrical quantity required in a case where all of the plurality of preset frames of the film are continuously photographed after the continuous photographing is started under the continuous photographing mode, presetting of the continuous photographing mode is permitted.

Further, the present invention is characterized in that, in the camera provided with the photographing mechanism by the interval photographing mode, in which the photographing is performed at the intervals of the preset time and the auto-power off mechanism, in which, when the camera is maintained for more than the predetermined time in the state where the camera power source is on, the power supply from the battery for the camera power source is automatically stopped, in a case where the interval photographing mode is preset, the residual charge of the battery is detected, and, only when a residue exceeds the sum of an electrical quantity consumed during the predetermined time, during which the auto-power off mechanism is operated in a state where the interval photographing mode is preset and an electrical quantity required in a case where all of the plurality of preset frames of the film are photographed after the interval photographing is started under the interval photographing mode, presetting of the interval photographing mode is permitted.

According to the present invention, in the camera provided with the photographing mechanism operable in the self-timer photographing mode, in which the plurality of preset frames of the film are photographed at the intervals of the predetermined time, the photographing mechanism operable in the continuous photographing mode, in which, when the shutter button is continuously pressed, the shutter releases are continuously performed at the intervals of the predetermined time, the photographing mechanism operable in the interval photographing mode, in which photographing is performed at the intervals of the preset time, or the auto-power off mechanism, in which, when the camera is maintained for more than the predetermined time in the state where the camera power source is on, the power supply from the battery for the camera power source is automatically stopped, in the case of presetting the various photographing modes, battery check corresponding to each of the respective photographing modes is performed.

This battery check is performed when a residual charge of the battery of the camera power source is detected, and the detected residual charge of the battery is compared with the sum of the electrical quantity consumed during the predetermined time, during which the auto-power off mechanism is operated in the state where one of the various photographing modes is set and the electrical quantity required in the case where the photographing under this photographing mode is completed after the photographing under the photographing mode is started. Then, only when the residual charge of the battery exceeds the added electrical quantity, the presetting of one of the photographing modes is permitted.

When the presetting of one of the photographing modes is permitted, the photographing can be reliably performed until the execution of the photographing mode is completed.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Detailed description will hereunder be given of the preferred embodiment of a method of checking a battery of a camera and a device according to the present invention with reference to the accompanying drawings.

Figure 1:
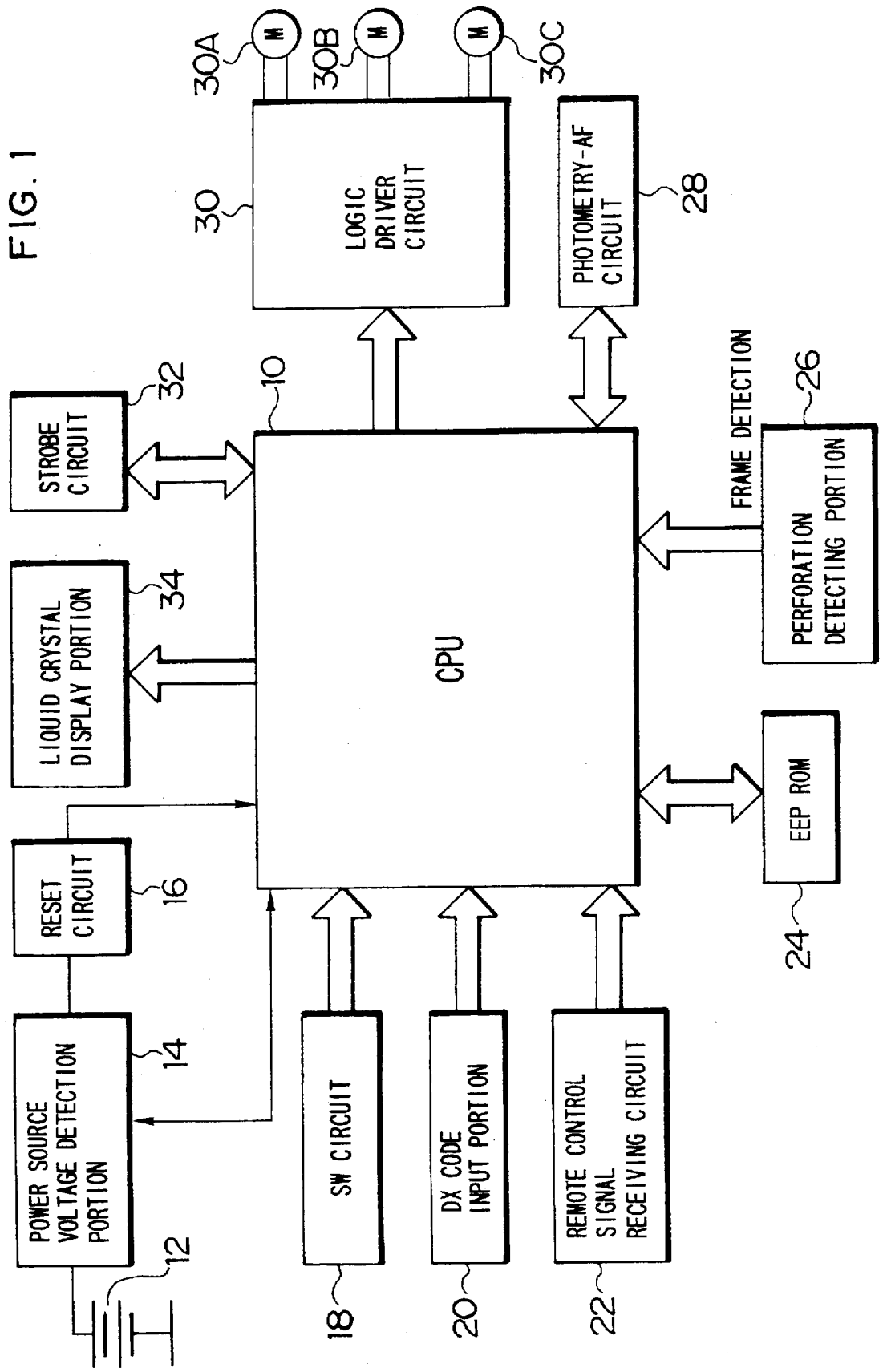
FIG. 1 is a block diagram showing an embodiment of a control section of a camera having a battery check mechanism, an auto-power off mechanism, a self-timer photographing mechanism, a continuous photographing mechanism and an interval photographing mechanism.

FIG. 1 is the block diagram showing the embodiment of the control section of the camera having the battery check mechanism, the auto-power off mechanism, the self-timer photographing mechanism, the continuous photographing mechanism and the interval photographing mechanism.

As shown, this camera control section is mainly constituted by a Central Processing Unit (CPU) 10, a battery 12, a power source voltage detecting portion 14, a reset circuit 16, a switch (SW) circuit 18, a DX code input portion 20, a remote control signal receiving circuit 22, an EEPROM (Electrically Erasable Programmable ROM) 24, a perforation detecting portion 26, a photometry-Auto Focus (AF) circuit 28, a logic driver circuit 30, a strobe circuit 32 and a liquid crystal display portion 34.

The power source voltage detecting portion 14 detects the voltage of the battery, this voltage value is converted into a digital signal by an A/D converter, not shown, and outputted to the CPU 10. Then, the CPU 10 performs the battery check of the battery 12 on the basis of the voltage value indicated by this digital signal. Incidentally, the detection of the voltage of the battery 12 by this power source voltage detecting portion 14 is operated in response to a command of the CPU 10, and stopped in operation except for the time necessary for the battery check, etc.

Now, in this camera, the battery check during the normal photographing is performed when a shutter button is half-pressed. When the shutter button is half-pressed during the normal photographing, the CPU 10 detects the voltage of the battery 12 from the power source voltage detecting portion 14, and a residue of the battery 12 is displayed on the liquid crystal display portion 34 on the basis of the detected voltage (The voltage of the battery 12 and the residual charge of the battery 12 are previously associated with each other in a ratio of 1 to 1, so that the residual charge of the battery 12 can be converted by the voltage of the battery 12).

Furthermore, the residual charge of the battery 12 is divided into three stages by use of the preset two levels and, when a part of the residual charge of the battery 12, which is divided by this arrangement has an electrical quantity enough for the photographing, a display of the "Battery OK" is made, and, the part of the residual charge has an electrical quantity which will become insufficient soon, a display of the "Battery Alarm" is made. Then, when the part of the residual charge of the battery 12 is insufficient for the photographing of one frame of the film (An electrical quantity for one time of photographing, i.e., which is necessary for a shutter release and a stand-by for the following photographing of a frame is insufficient), a display of the "Insufficient Battery" is made and the shutter release is prohibited.

That is, a previously set threshold value of the residual charge of the battery (alarm level) which is sufficient for photographing and a threshold value (NG level) of an electric power necessary for photographing one frame of the film (an electric power necessary for a shutter release and a stand-by for the following photographing of a frame), and the level of the voltage of the battery 12, which is detected from the power source voltage detecting portion 14 is compared with these alarm level and NG level (alarm level>NG level). Then, when the voltage of the battery 12 is higher than the alarm level, the "Battery OK" is displayed on the liquid crystal display portion 34, when the voltage of the battery 12 is lower than the alarm level and higher than the NG level, the "Battery Alarm" is displayed on the liquid crystal display portion 34, and, when the voltage of the battery 12 is lower than the NG level, the "Insufficient Battery" is displayed on the liquid crystal display portion 34. Particularly, in the case of the "Insufficient Battery", the shutter release is prohibited.

The reset circuit 16 outputs a reset signal to the CPU 10 when the camera power source is turned on to thereby initialize the CPU 10.

The switch circuit 18 outputs signals from various switches to the CPU 10. For example, there are the outputting signals indicating whether the shutter release button is half-pressed or fully pressed, a signal indicating whether a self-mode switch (switch for setting the photographing mode) is pressed or not, and signals corresponding to the switch operations of the camera such as a signal whether the strobe photographing mode is selected or not and a signal indicating whether the remote control photographing mode is selected or not.

The DX code input portion 20 reads out a DX code from a cartridge loaded into the camera, and outputs this DX code to the CPU 10. In the DX code, there are recorded information including the number of frames of the film and an ISO sensitivity, and the information obtained from the DX code input portion 20 is used as the photographing information.

The remote control signal receiving circuit 22 is operated only when a remote control photographing mode is preset, and, when the remote control photographing mode is preset, the remote control signal receiving circuit 22 receives signals of the shutter release or the like, which is outputted from a remote controller and the received signal is outputted to the CPU 10.

The EEPROM 24 maintains the memory so as not to lose various data of the camera when the camera power source is turned off or when the power supply is stopped in the case of battery change and discharge of the battery. In this EEPROM 24, there are the stored data about the camera operations and the like during the loading of a film, during a single frame feeding, during the rewinding and during the stand-by. That is, the CPU 10 writes the state of the camera operations during the loading of a film, during a single frame feeding, or during the rewinding into the EEPROM 24 immediately before the driving of a motor 30B for feeding the film through the logic driver circuit 30 and writes the state of the camera operations indicating the stand-by into the EEPROM 24 immediately before the stop of the motor 30B for feeding the film after completion of the loading of the film or the single frame feeding.

Then, when the power source is on, the CPU 10 reads out the information about the camera operations from the EEPROM 24 and continuously performs the camera operations at the time when the camera operations are stopped.

The perforation detecting portion 26 detects perforations formed in the film when the film is moved, and outputs a pulse signal to the CPU 10 whenever one perforation is detected. The CPU 10 performs the control of film conveyance on the basis of this pulse signal.

The photometry-AF circuit 28 is adapted to measure a subject distance on the basis of brightness of a subject and the trigonometrical survey. When the shutter release button is half-pressed and commands for a photometry and a distance measuring are given by the CPU 10, the photometry AF circuit 28 performs the photometry and the distance measuring and outputs the results of photometry and distance measuring to the CPU 10.

The logic driver circuit 30 is adapted to drive a stepping motor 30A for controlling shutter-exposure, the motor 30B for the film feeding, a motor 30C for moving a lens and the like.

The strobe circuit 32 is charged during the strobe photographing. When a command is inputted for luminescing at a predetermined timing in association with the shutter release from the CPU 10, the strobe circuit 32 is made to luminesce.

Incidentally, the self-mode switch is provided in the above-described camera. When this self-mode switch is pressed, in a circulating manner, the self-timer photographing mode, the continuous photographing mode or the interval photographing mode is successively preset. The CPU 10 increases a self-mode counter provided therein by one count whenever this self-mode switch is pressed once.

When the value of this self-mode counter is 0, the normal photographing is set, when the value of the self-mode counter is 1 to 3, the self-timer photographing mode is set, when the value of the self-mode counter is 4, the continuous photographing mode is set, and the value of the self-mode counter is 5, the interval photographing mode is set.

When the value of the self-mode counter is 5, if the self-mode switch is pressed once more, then the value of the self-mode counter is reset at 0.

Incidentally, when the value of the self-mode counter is 1 to 3, this value of the self-mode counter indicates the number of frames to be taken under the self-timer photographing mode. Under the self-timer photographing mode, the shutter release for the first photographing is performed 10 seconds after the shutter button is pressed, and the shutter releases for the second photographing and thenceforth are performed at the intervals of 3 seconds.

Furthermore, when photographing is made under the interval photographing mode, the time interval for the shutter release may be preset at a desirable time by the switch operation of a switch, not shown.

When any one of the photographing modes including the self-timer photographing mode, the continuous photographing mode and the interval photographing mode is selected by the operation of the self-mode switch as described above, the CPU 10 performs the battery check in association with the respective photographing modes.

As will be described hereunder, when the self-timer photographing mode, the continuous photographing mode or the interval photographing mode is selected, the CPU 10 calculates a self OK level, a continuous photographing OK level or an interval OK level, any one of which indicates the residue of the battery, which is the irreducible minimum of a demand from the preset time of the selected photographing mode to the completion of the execution of the photographing mode, in association with the respective photographing modes.

Then, the CPU 10 determines whether the residual charge of the battery 12 which is detected from the power source detecting portion 14 exceeds the above-described levels or not, permits the selected photographing mode only when the residual charge of the battery 12 exceeds the OK levels, and prohibits the presetting of the photographing mode when the residual charge of the battery 12 is lower than the OK levels.

Incidentally, when the CPU 10 calculates the levels to be determined as described above, the time periods from the presetting of the photographing mode to the actual pressing of the shutter button are different for each of the photographings, and the electric power to be consumed during this time cannot be ascertained. For this, the electric power to be consumed during this time is regarded as the electric power to be consumed before the camera power source is turned off by the auto-power off mechanism. With this arrangement, the level of the electrical quantity of the battery 12, which is the irreducible minimum of a demand until any one of the respective photographing modes is completed.

The auto-power off mechanism described above is the mechanism for automatically turning off the camera power source when the photographing stand-by state (a state where no switch operation is performed) continues for 5 minutes. The CPU 10 checks a signal outputted from the switch circuit 18 by the switch operation, and, if a signal showing the performance of the switch operation is not outputted from the switch circuit 18 for more than 5 minutes, then the CPU 10 stops the operations of the respective circuits and the power supply from the battery 12 is stopped, and the CPU 10 is brought into the stand-by state.

Figure 2:
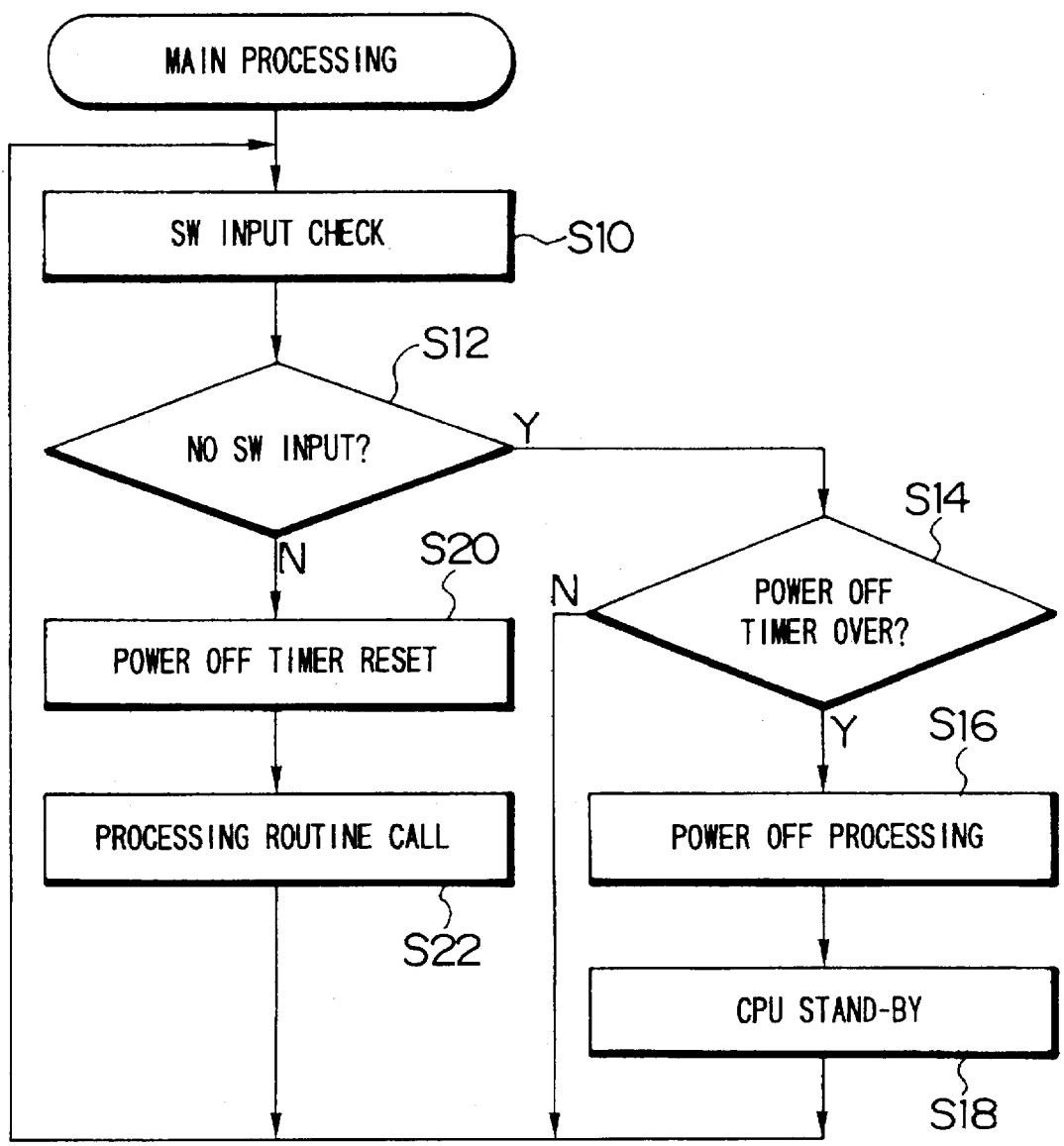
FIG. 2 is a flow chart showing a main processing of a CPU.
Figure 3:
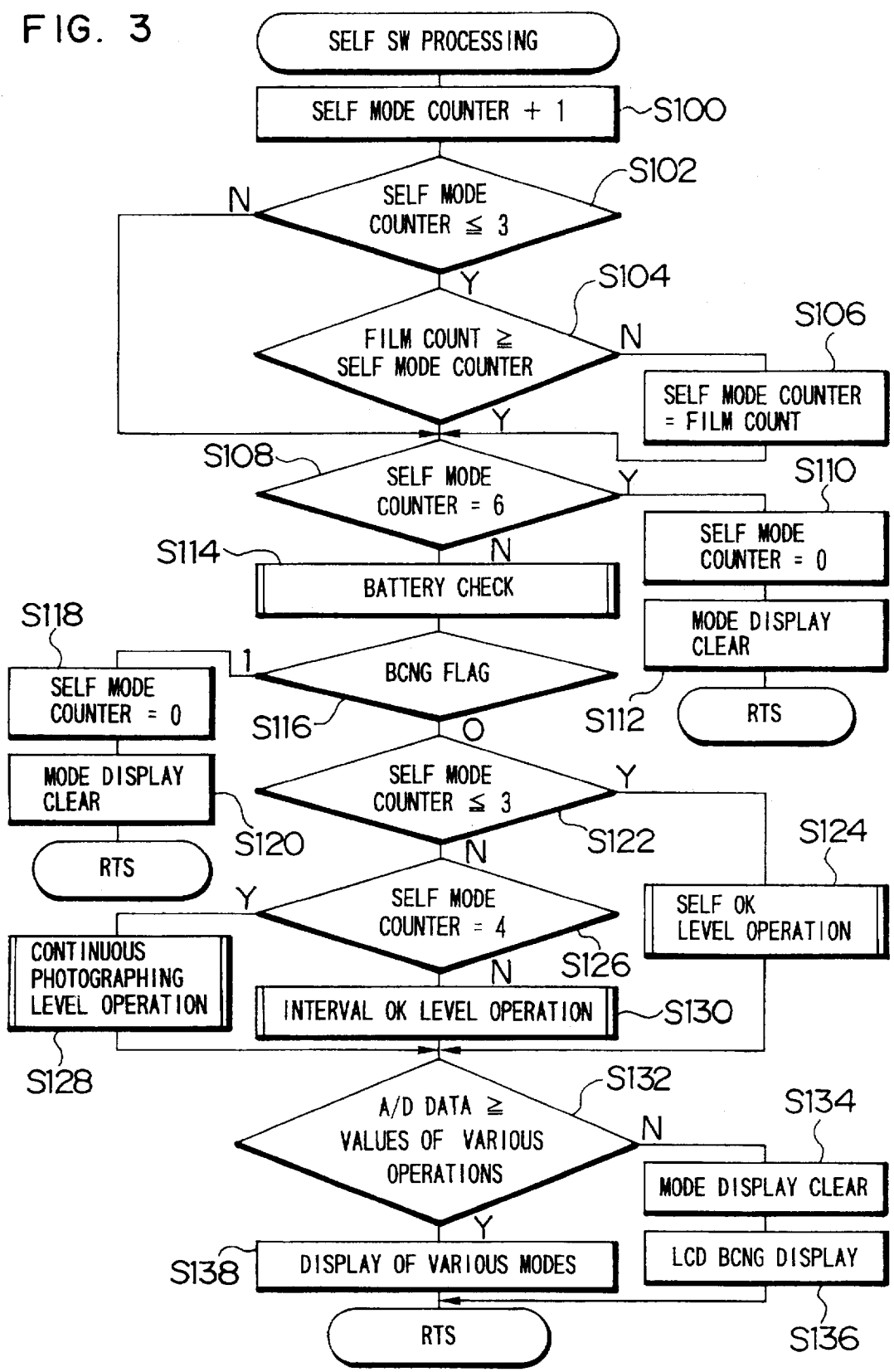
FIG. 3 is a flow chart showing a self SW processing of the CPU.
Figure 4:
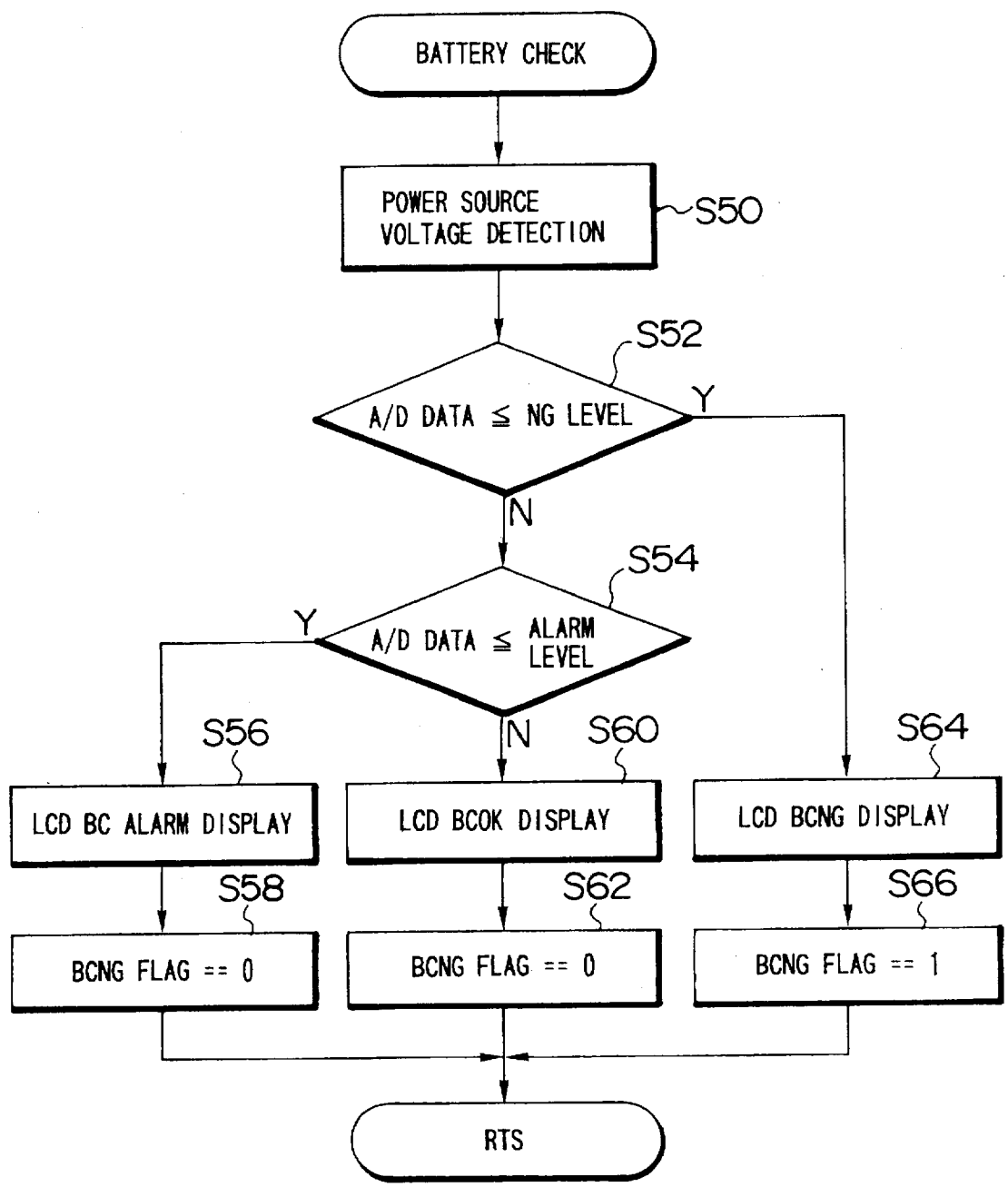
FIG. 4 is a flow chart showing a battery check processing of the CPU.

Subsequently, description will be given of the procedure of processing of the battery check in the various photographing modes in the above-described camera, with reference to the flow charts as shown in FIGS. 2, 3, and 4. Incidentally, the procedure of processing of the battery check, which is performed by half-pressing of the shutter button during the normal photographing will be shown in the flow chart in FIG. 4. The details thereof will be described hereunder.

When the camera power source is on and the electric power is supplied to the CPU 10, the CPU 10 first starts the main processing as shown in FIG. 2. In this main processing, the CPU 10 checks an output signal from the switch circuit 18 (Step S10), and determines whether any switch operation is performed or not (Step S12).

If no switch operation is performed, then the CPU 10 determines whether a power-off timer passes over 5 minutes or not (Step S14). The power-off timer is adapted to measure a continuous time, during which the switch operation is not performed. When the power-off timer does not pass over 5 minutes, the process returns to Step S10 and repeats to check output signals from the switch circuit 18.

When the power-off timer passes over 5 minutes, the respective circuits are stopped in operation, the power supply to the respective circuits from the battery 12 is stopped (Step S16), and the CPU 10 itself is brought into the stand-by state (Step S18). When some switch operation is performed in the stand-by state, a signal for releasing the stand-by state of the CPU 10 is outputted from the switch circuit 18. With this arrangement, the CPU 10 reopens the power supply to the respective circuits and starts the processing corresponding to the switch operations.

On the other hand, in Step S12, when it is determined that some switch operation is performed, the power-off timer is reset (Step S20), and a processing routine corresponding to the switch operation is performed (processing routine call) (Step S22).

After the processing routine corresponding to the switch operation is performed, upon completion of this processing routine, the process returns to Step S10, the switch operation to be performed subsequently is checked, and the above-described processing is repeated.

Description of the processing routine in a case where the above-described switch operation is the operation of the self-mode switch will hereunder be described with reference to the flow charts shown in FIGS. 3 and 4.

When the self-mode switch is operated, the CPU 10 performs a self SW processing routine shown in FIG. 3.

When the self-mode switch is pressed once, the CPU 10 increases the value of the self-mode counter by one (Step S100). Then, the CPU 10 determines whether the value of the self-mode counter is less than 3 or not (Step S102). That is, the CPU 10 determines whether the self-timer photographing mode is selected or not.

If the value of the self-mode counter is less than 3, the CPU 10 determines whether the value of the self-mode counter is less than a film count or not (Step S104). At this time, when the value of the self-mode counter is not less than the film count, the value of the self-mode counter is set at the film count (Step S106). That is, the value of the self-mode counter indicates the number of frames to be taken under the self-timer photographing mode, and the film count indicates the number of remaining frames of the film. If the specified number of frames to be taken under the self-timer photographing mode is larger than the number of the remaining frames of the film, then the specified number of frames cannot be photographed, so that the number of frames to be forcibly photographed under the self-timer photographing mode is set at the number of the remaining frames of the film.

On the other hand, when the value of the self-mode counter is less than the film count, or, when, in Step S102, it is determined that the value of the self-mode counter is not less than 3, subsequently, it is determined whether the value of the self-mode counter is 6 or not (Step S108).

If the value of the self-mode counter is 6, then, the value of the self-mode counter is reset at 0 (Step S110), and the photographing mode display on the liquid crystal display portion 34 of the camera is cleared (Step S112). That is, the case where the value of the self-mode counter is 6 is a case where the normal photographing is performed. At this time, the value of the self-mode counter is set at 0 which indicates the normal photographing, and the display of the photographing mode is cleared. Then, this sub-routine is completed.

On the other hand, when the value of the self-mode counter is not 6, i.e., when some photographing mode is selected, the battery check shown in FIG. 4 is performed (Step S114). This battery check is the battery check performed when the shutter button is half-pressed during the normal photographing as described above.

Here, if the procedure of the battery check as shown in FIG. 4 is explained, then, firstly, the voltage of the battery 12 is read out as a digital signal from the power source voltage detecting portion 14 through an A/D converter (Step S50), and it is determined whether the voltage of the battery 12 as indicated by this digital signal is less than the NG level or not (Step S52).

If the voltage of the battery 12 is less than the NG level, then the display of the "Insufficient Battery" is made on the liquid crystal display portion 34 (Step S64), and a BCNG flag is set at 1 (Step S66).

On the other hand, when the voltage of the battery 12 is larger than the NG level, subsequently, it is determined whether this voltage is less than the alarm level or not (Step S54). If the voltage of the battery 12 is less than the alarm level, then the display of the "Battery Alarm" is displayed on the liquid crystal display portion 34 (Step S56), and the BCNG flag is reset at 0 (Step S58).

When the voltage of the battery 12 is larger than the alarm level, the display of "Battery OK" is displayed on the liquid crystal display portion 34 (Step S60), and the BCNG flag is reset at 0 (Step S62).

As described above, when the voltage of the battery 12 is less than the NG level, the BCNG flag is set at 1, and, when the voltage of the battery 12 is larger than the NG level, the BCNG flag is reset at 0.

Then, the process returns to the self SW processing routine shown in FIG. 3 again. In the self SW processing routine shown in FIG. 3, firstly, it is determined whether the BCNG flag is 1 or not (Step S116). At this time, when the BCNG flag is 1, the value of the self-mode counter is reset at 0 (Step S118), and the display of the photographing mode on the liquid crystal display portion 34 is cleared (Step S120). That is, when the voltage of the battery 12 is less than the NG level, it is impossible to photograph even one frame of the film during the normal photographing, so that presetting of the photographing mode is prohibited, and the display of the photographing mode on the liquid crystal display portion 34 is cleared. Then, this self SW processing routine is completed.

On the other hand, when the BCNG flag is not 1, i.e., the BCNG flag is 0, it is determined whether the value of the self-mode counter is less than 3 or not (step S122). When the value of the self-mode counter is less than 3, the self OK level is calculated (Step S124).

The self OK level is obtained such that an electric power of the battery 12 which is consumed for 5 minutes from the time of presetting of the self-timer photographing mode to the operation of the auto-power off mechanism is added to an electric power for performing the photographing of the number of frames indicated by the self-mode counter (This electric power includes an electric power necessary for the time from the shutter releases for the respective photographings to the stand-by for the following frame photographing, an electric power consumed for the stand-by time of 10 seconds from the time, at which the shutter button is pressed, to the time of photographing of the first frame and an electric power consumed for the stand-by time of 3 seconds at the time of photographing the second frame and in the case where the self-mode counter is 2 or 3), and the added electric power as described above is converted into a value of the voltage of the battery 12.

In the case where the value of the self-mode counter is not less than 3, subsequently, it is determined whether the value of the self-mode counter is 4 or not (Step S126), and, at this time, when the value of the self-mode counter is 4, calculation of the continuous photographing OK level is made.

The continuous photographing OK level is obtained such that an electric power of the battery 12 which is consumed for 5 minutes from the time of presetting the continuous photographing mode to the operation of the auto-power off mechanism is added to an electric power necessary for performing photographing of the remaining number of frames of the film indicated by a film counter (Similarly to the case of the self OK level, this electric power includes the electric power for the time from the shutter releases for the respective photographings to the stand-by for the following frame photographing, and an electric power consumed for the interval times between the respective photographings), and the added electric power as described above is converted into a value of the voltage of the battery 12.

Further, when the value of the self-mode counter is not 4, i.e., when the value of the self-mode counter is 5, calculation of the interval OK level is made (Step S130). The interval OK level is obtained in such a way that an electric power of the battery 12 which is consumed for 5 minutes from the time of presetting of the interval photographing mode to the operation of the auto-power off mechanism is added to an electric power for performing the photographing of the remaining number of frames of the film indicated by the film counter (Similarly to the cases of the self OK level and the continuous photographing OK level, this electric power includes an electric power required for the time from the shutter releases for the respective photographings to the stand-by for the following frame photographing, and the electric power consumed for the interval times between the respective photographings. Incidentally, the electric power consumed may be different depending upon the set values of the interval times, and this electric power is calculated by the set value of the interval time), and the added electric power as described above is converted into a value of the voltage of the battery 12.

The OK levels are calculated indicating the electric power of the irreducible minimum before the completion of the execution of the respective photographing modes in accordance with the values of the self-mode counter as described above, and thereafter, it is determined whether the voltage of the battery 12 detected from the power source voltage detecting portion 14 exceeds the OK level of the photographing mode indicated by the self-mode counter or not (Step S132).

If the voltage of the battery 12 is lower than the OK level, then the display of the photographing mode on the liquid crystal display portion 34 is cleared (Step S134), and the display of the "Insufficient Battery" is performed (Step S136). That is, presetting of the photographing mode selected by the self-mode switch is prohibited.

On the other hand, when the voltage of the battery 12 exceeds the OK level, the photographing mode indicated by the self-mode counter is displayed on the liquid crystal display portion 34, and presetting of this photographing mode is permitted.

As described above, battery checks corresponding to the various photographing modes are performed, and, after the battery checks are finished, this self SW processing routine is completed and the process returns to the main processing as shown in FIG. 2.

As has been described above, according to the method of checking the battery of the camera and the device in the present invention, a residue of the battery is detected at the time of presetting the various photographing modes, and only when the residual charge of this battery exceeds the added value of the electric power consumed during the predetermined time, during which the auto-power off mechanism is operated in the state where the various photographing modes are set and of the electric power consumed for the time from the start of the photographing mode selected at the time of presetting the various photographing modes to completion of the execution of this photographing mode, presetting of the selected photographing mode is permitted, so that when the presetting of the photographing mode is permitted, the photographing can be reliably carried out until the execution of the photographing mode is completed.

It should be understood, however, that there is no intention to limit the invention to the specific forms disclosed, but on the contrary, the invention is to cover all modifications, alternate constructions and equivalents falling within the spirit and scope of the invention as expressed in the appended claims.

I claim:

1. A method of checking a battery in a camera provided with means for performing a self-timer photographing function for photographing a preset number of frames at predetermined time intervals in a self-timer photographing mode, and means for performing an auto-power off function for automatically stopping the supplying of power to said camera from said battery after power has been supplied to said camera for a predetermined time without said camera having been operated, said method of checking the battery in the camera comprising the steps of:

detecting a residual electrical charge of said battery at the time of selecting the self-timer photographing mode, and permitting setting of said self-timer photographing mode only when said residual charge exceeds an electrical quantity which is the sum of an electrical quantity required for powering of said camera during said predetermined time intervals of the self-timer photographing mode and until said auto-power off function works and an electrical quantity required for photographing said preset number of frames during the preset self-timer photographing mode.

2. A device for checking a battery in a camera provided with means for performing a self-timer photographing function for photographing a pre-set number of frames at predetermined time intervals in a self-timer photographing mode, and means for performing an auto-power off function for automatically stopping the supplying of power to said camera from said battery after power has been supplied to said camera for a predetermined time without said camera having been operated, said device for checking the battery in the camera comprising:

detecting means for detecting a residual electrical charge of said battery;

calculating means for calculating an electrical quantity which is the sum of an electrical quantity required for powering of said camera during said predetermined time intervals of the self-timer photographing mode and until said auto-power off function works and an electrical quantity required for photographing said preset number of frames during the preset self-timer photographing mode in response to selecting of the self-timer photographing mode; and setting means for permitting said setting of said self-timer photographing mode only when the residual charge detected by said detecting means exceeds said sum of said electrical quantities calculated by said calculating means.

3. A method of checking a battery in a camera provided with means for performing a continuous photographing function for continuous photographing at predetermined time intervals in a continuous photographing mode when a shutter release button is pressed, and means for performing an auto-power off function for automatically stopping the supplying of power to said camera from said battery after power has been supplied to said camera for a predetermined time without said camera having been operated, said method of checking the battery in the camera comprising the steps of:

detecting a residual electrical charge of said battery in response to selecting of the continuous photographing mode; and permitting setting of said continuous photographing mode only when said residual charge exceeds an electrical quantity which is the sum of an electrical quantity required for powering of said camera during said predetermined time intervals of the continuous photographing mode and until said auto-power off function works and an electrical quantity required for photographing all remaining frames on the film during the continuous photographing mode.

4. A device for checking a battery in a camera provided with means for performing a continuous photographing function for continuous photographing at predetermined time intervals in a continuous photographing mode when a shutter release button is pressed, and means for performing an auto-power off function for automatically stopping the supplying of power to said camera from said battery after power has been supplied to said camera for a predetermined time without said camera having been operated, said device for checking the battery in the camera comprising:

detecting means for detecting a residual electrical charge of said battery;

calculating means for calculating an electrical quantity which is the sum of an electrical quantity required for powering of said camera during the predetermined time intervals of the continuous photographing mode and until said auto-power off function works and an electrical quantity required for photographing all remaining flames on the film during the continuous photographing mode in response to selecting of the continuous photographing mode; and setting means for permitting setting of said continuous photographing mode only when the residual charge detected by said detecting means exceeds said sum of said electrical quantities calculated by said calculating means.

5. A method of checking a battery in a camera provided with means for performing an interval photographing function for photographing at predetermined time intervals in an interval photographing mode, and means for performing an auto-power off function for automatically stopping the supplying of power to said camera from said battery after power has been supplied to said camera for a predetermined time without said camera having been operated, said method of checking the battery in the camera comprising the steps of:

detecting a residual electrical charge of said battery in response to selecting of the interval photographing mode; and permitting setting of said interval photographing mode only when said residual charge exceeds an electrical quantity which is the sum of an electrical quantity required for powering of said camera during the predetermined time intervals of the interval photographing mode and until said auto-power off function works and an electrical quantity required for photographing all remaining frames on the film during the set interval photographing mode.

6. A device for checking a battery in a camera provided with means for performing an interval photographing function for photographing at predetermined time intervals in an interval photographing mode, and means for performing an auto-power off function for automatically stopping the supplying of power to said camera from said battery after power has been supplied to said camera for a predetermined time without said camera having been operated, said device for checking the battery in the camera comprising:

detecting means for detecting a residual electrical charge of said battery;

calculating means for calculating an electrical quantity which is the sum of an electrical quantity required for powering of said camera during the predetermined time intervals of the interval photographing mode and until said auto-power off function works and an electrical quantity required for photographing all remaining frames on film during preset interval photographing mode in response to selecting of the interval photographing mode; and setting means for permitting said setting of said interval photographing mode only when said residual charge detected by the detecting means exceeds the sum of said electrical quantities calculated by said calculating means.

* * * * *